United States Patent [19]

Jenkins

[11] Patent Number: 4,917,558
[45] Date of Patent: Apr. 17, 1990

[54] VARIABLE-VOLUME BIN FOR STORING AND DISPENSING PARTICULATE MATERIALS

[75] Inventor: Bryan M. Jenkins, Davis, Calif.

[73] Assignee: Regents of the University of California, Alameda, Calif.

[21] Appl. No.: 295,486

[22] Filed: Jan. 10, 1989

[51] Int. Cl.⁴ .................................................. B65G 65/36
[52] U.S. Cl. ......................................... 414/288; 110/110; 222/305; 414/197; 414/326; 414/745.1; 414/786; 414/924; 298/1 B
[58] Field of Search ............................ 414/173–175, 414/187, 195, 197, 296, 301, 326, 527, 545, 745.1, 924, 796.7, 796.8, 786; 298/1 B; 110/108, 110, 329, 330, 269; 222/282, 287, 305; 198/347, 540, 541

[56] References Cited

U.S. PATENT DOCUMENTS

| | | | |
|---|---|---|---|
| 2,599,840 | 6/1952 | Keele et al. | 110/108 X |
| 2,938,639 | 5/1960 | Boyd | 414/296 |
| 2,997,828 | 8/1961 | Ahlbor | 198/347 X |
| 3,506,142 | 4/1970 | White | 414/745.9 X |
| 4,170,311 | 10/1979 | Spaw | 414/296 X |

FOREIGN PATENT DOCUMENTS 30984  10/1960  Finland ........................ 414/745.1

Primary Examiner—Robert J. Spar
Assistant Examiner—Keith L. Dixon
Attorney, Agent, or Firm—Owen, Wickersham & Erickson

[57] ABSTRACT

A device and method for holding and delivering a load of particulate material such as wood blocks, wood chips—dry or moist—, and briquettes. A main bin has an open upper end, closed side walls, and a closed bottom wall. A pair of drive shafts are journaled across and in the side walls of the main bin, with a motor therefor. A flexible belt has one end secured to a first such drive shaft on one side of the bin and another end secured to a second such drive shaft on the opposite side of the bin. A continuous chain driven by the motor drives said drive shafts, and there is an idler associated with the chain and one of the drive shafts for reversing the direction of rotation of that drive shaft, so that rotation of the two drive shafts slackens the belt enabling loading. The belt, when tightened and raised, drops the load into said main bin. A pair of side wall members may be secured to the main bin on each side of the flexible belt, and a delivery device is supported by the main bin and extends from one wall of the bin to and through the opposite wall at the lower end of the bin.

14 Claims, 5 Drawing Sheets

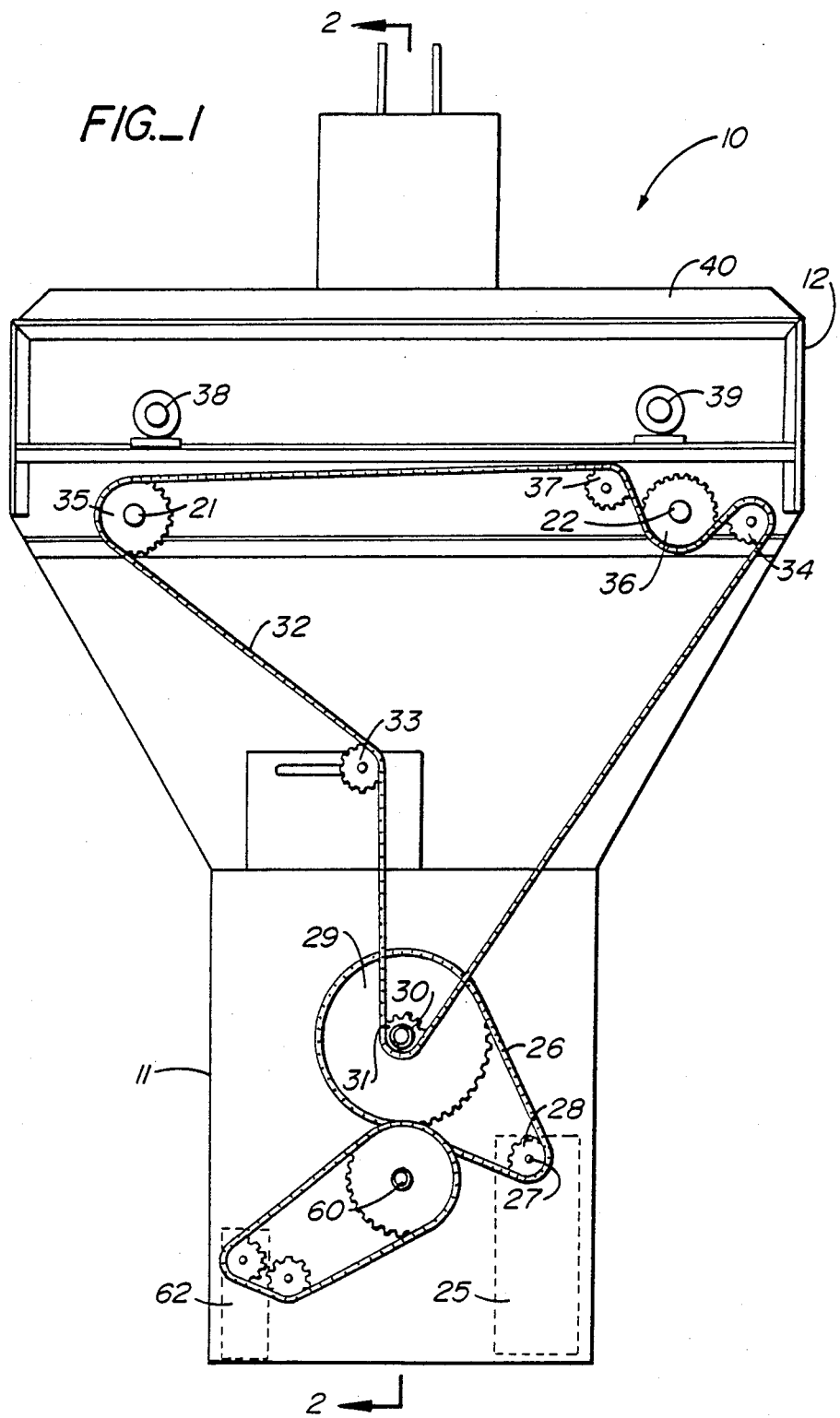

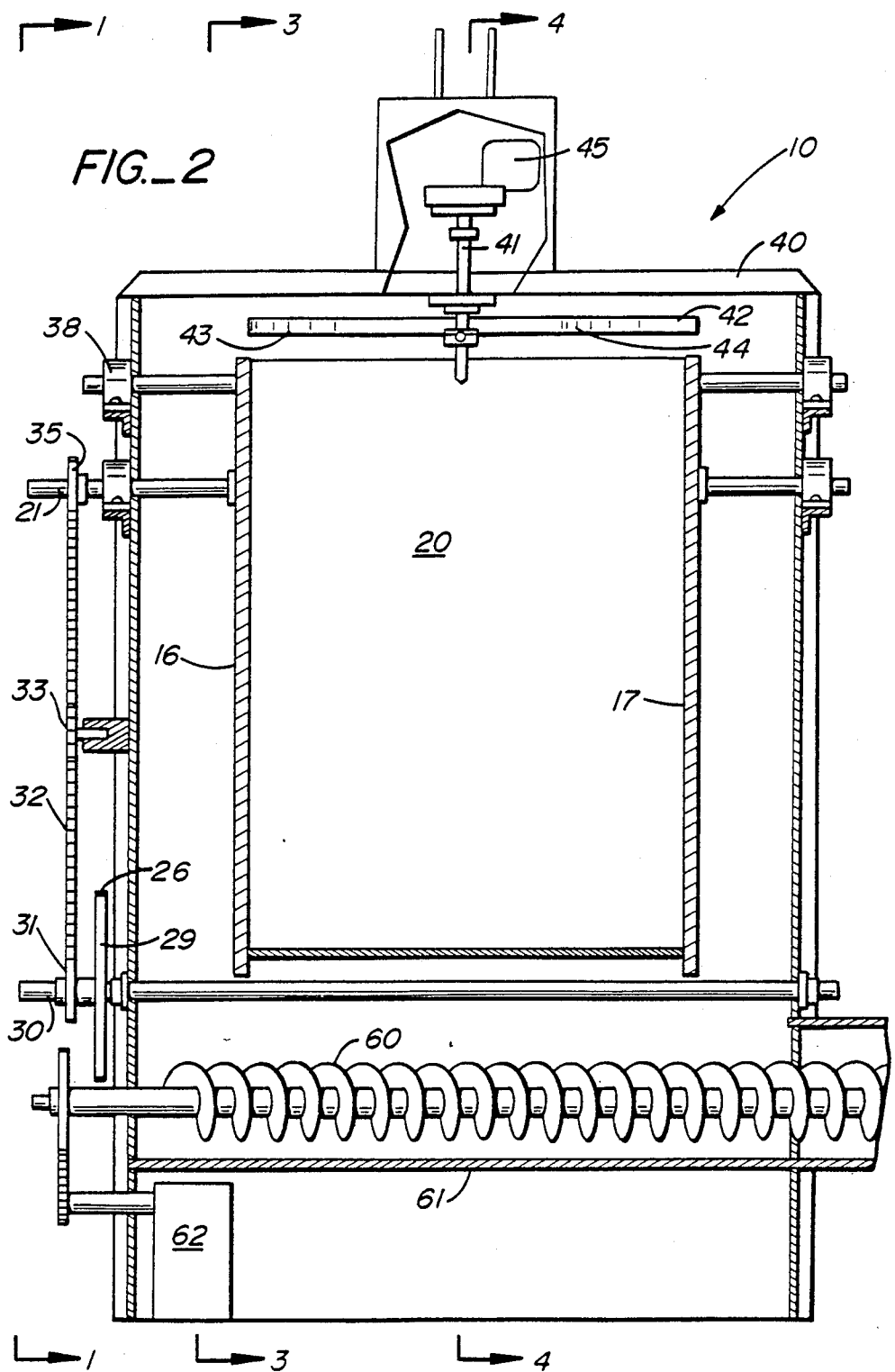
FIG._2

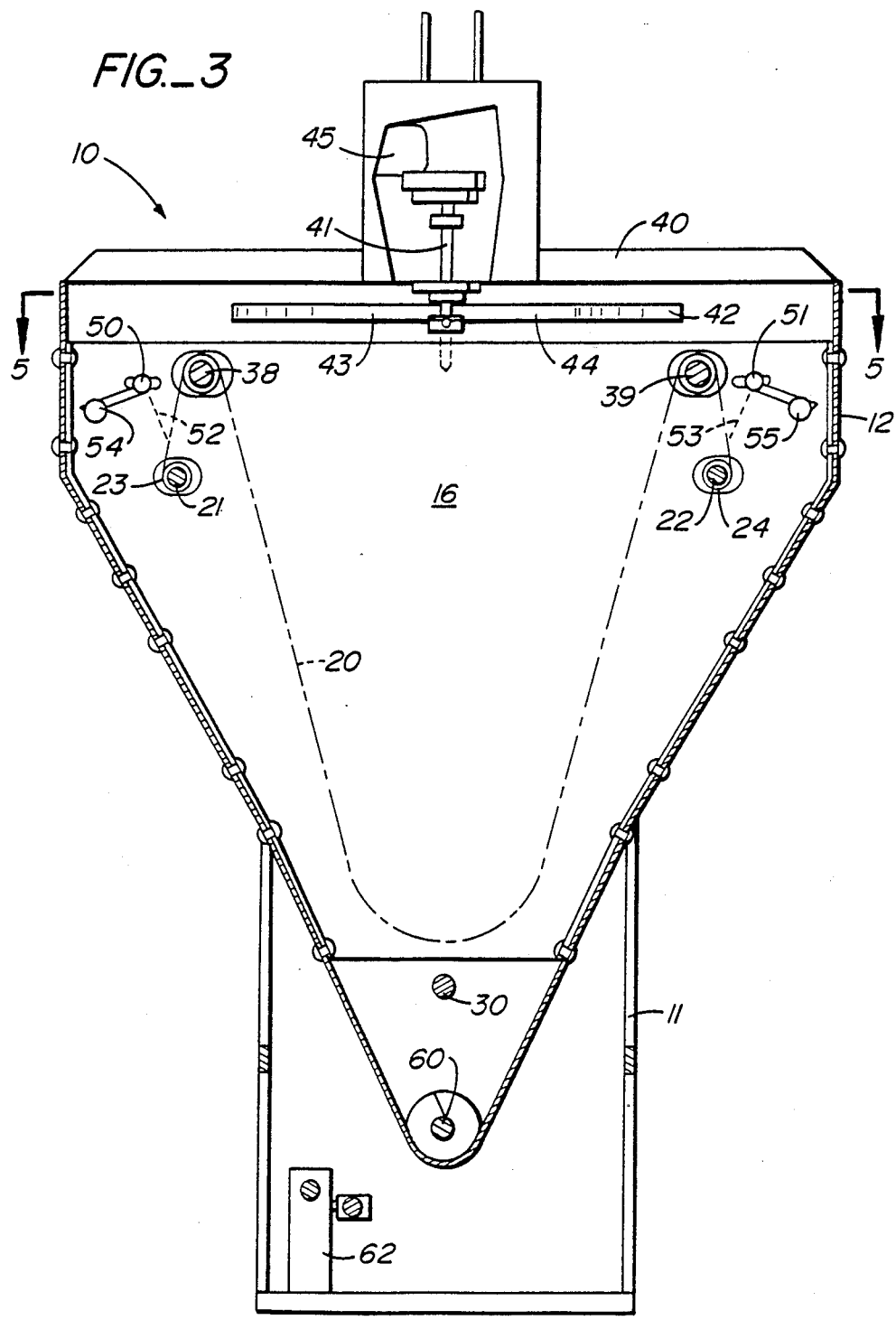

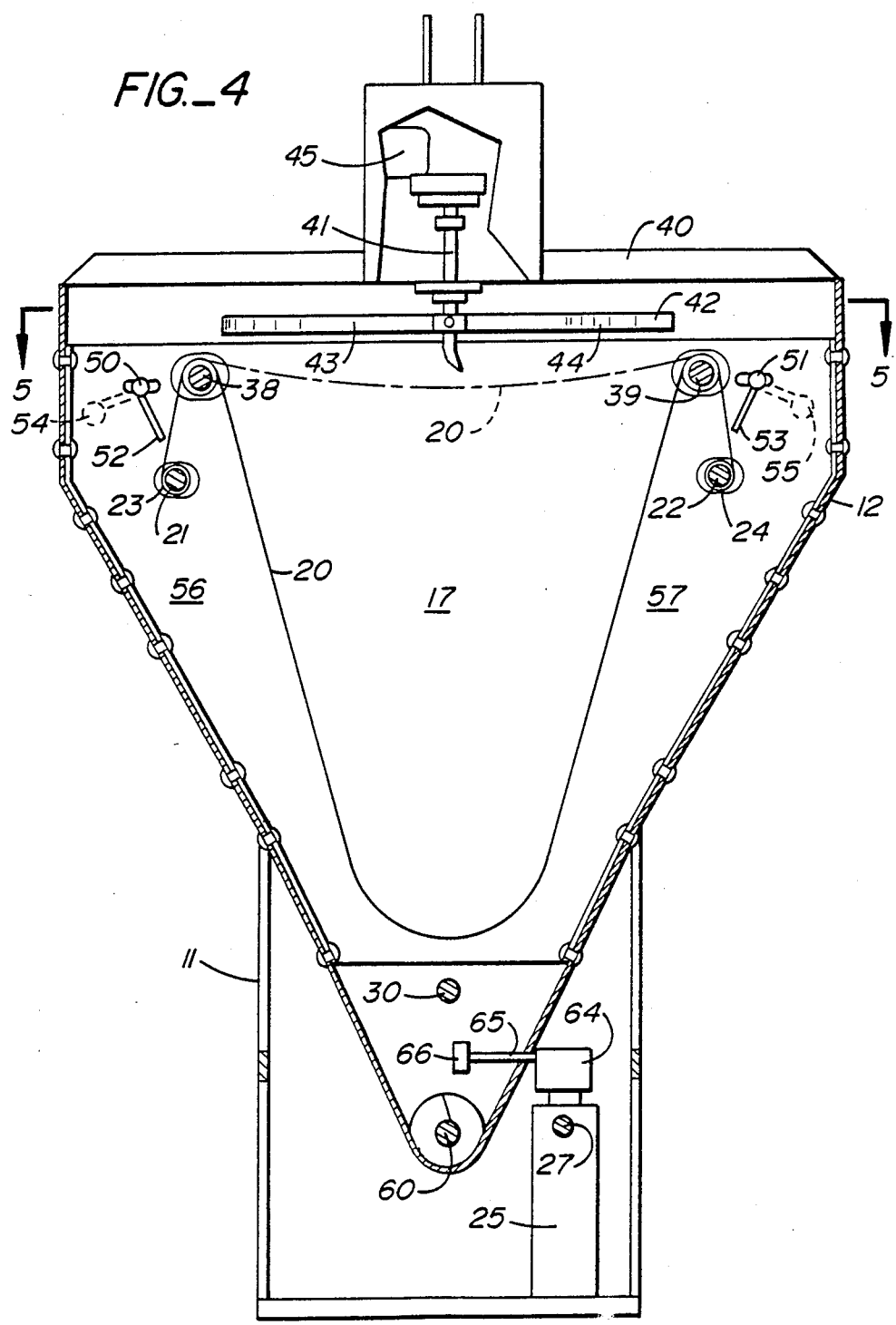
FIG._4

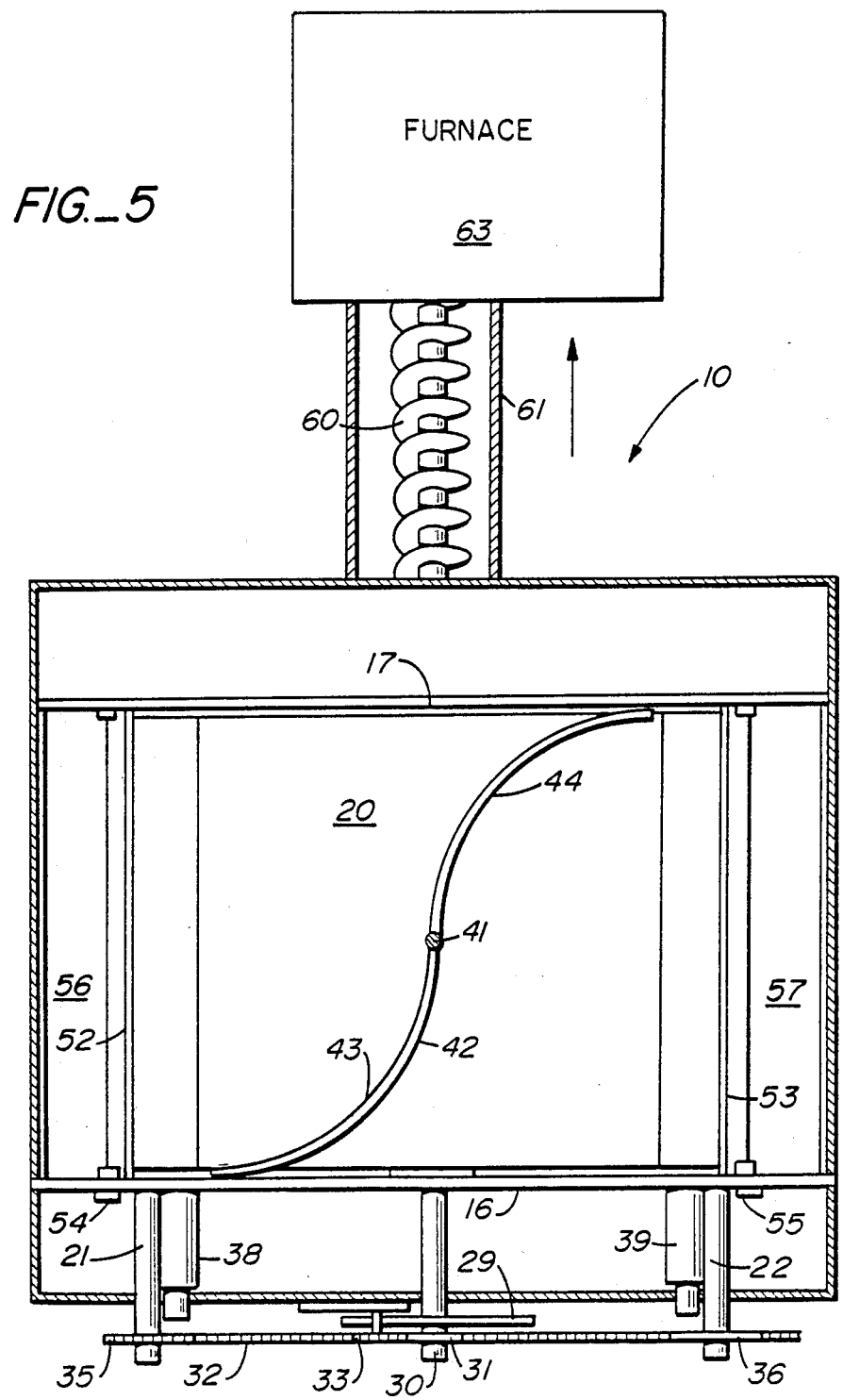
FIG._5

VARIABLE-VOLUME BIN FOR STORING AND DISPENSING PARTICULATE MATERIALS

This invention relates to a variable-volume bin for storing and dispensing particulate materials such as wood chips, whether wet or dry, wood blocks of various size, or briquettes, particularly when they vary in size, and similar items.

The bin uses a flexible belt connected at each end to drive shafts or rollers that, when driven, can shorten the belt's length, and therefore decrease the volume contained within the variable-volume bin. When rotated in the opposite direction, the rollers increase the bin's volume. The belt is located between two closely adjacent walls, which may be spaced from the main walls of the bin. The belt ends themselves also act, when wound up, to spill materials that have been stored on the belt, over the top of the belt, into a space provided within the walls of the main bin or container.

The belt is loaded and is unloaded by putting material to be stored onto the belt from the top thereof. The unloading action is assisted by a rotating spill-off member that lies just above the top level of the belt. The belt is also cleaned off by wiper members as it is wound up.

BACKGROUND OF THE INVENTION

The purpose of the device of this invention is to overcome the strange effects of bridging and rat-holing, normally encountered in conventional gravity-fed bins when handling particulate materials such as woodchips, wood blocks or briquettes that vary in size. The flow of material from such a normal device is usually out from the bottom, but even if the material flows out at the top, it spills down toward the bottom, and the particles tend to bridge over themselves in such a way as to prevent further flow. The flow of material from the device of this invention is not solely dependent on gravity, because the material has no opportunity to bridge or otherwise become obstructed in flowing from the bin to a delivery apparatus, such as an auger or a conveyor down at the bottom of the main bin. Bridging and rat-holing have been found to be extremely problematical when such materials as irregularly sized wood chips, especially moist wood chips, are delivered into combustion reactors, such as furnaces. Other materials also exhibit this type of behavior.

An object of the invention is to provide satisfactory feeding of wood chips, whether dry or moist, wooden blocks or pieces of various sizes, briquettes and so on; so that they can be fed properly from the storage device to a combustion reactor or furnace. The device eliminates a number of obstacles that impede the operation of small scale automatically controlled systems for handling biomass and other materials.

SUMMARY OF THE INVENTION

The device of this invention includes a flexible belt inside and spaced inwardly from a main bin. The belt ends are secured to a pair of shafts journaled across the main bin and driven, as by a continuous chain in combination with sprockets. When the belt is to hold its maximum amount, it is elongated and hangs down in a type of catenary or cosine curve ready to receive the material. The device may then be loaded from the top with the main bin open, so that the material can fall down from there onto the belt. Later, when it is desired to dispense the material, the belt ends are gradually wound up by and around the driven shafts.

As the material approaches the upper end of the bin, a blade-like spill-off device is rotated horizontally to drive the material off at each of the two ends of the flexible belt. The sides of the belt are closed off by a pair of rigid members, which, may make up the walls of the bin. The main bin may be smaller at the bottom than at the top, or may be, if desired, a simple cubic box, or the bin may be tapered out at the bottom.

At the bottom of the box or main bin is an auger or conveyor belt or some driven member to carry off the material with which the bin has been loaded, taking it out from the main bin, and to convey it over to a furnace or other such device where the material is used, or to a loading system where the material can be put on trucks, or elsewhere.

There is plenty of space at each end of the belt to enable the material to fall down inside the main bin. However, if it simply fell down toward the auger, it might tend to block itself by bridging over or rat-holing, so that soon no material would be fed out from the bottom of the main bin. In order to prevent this from happening, the device preferably includes a level indicator which indicates when the material has reached a certain predetermined level, and this level indicator is used to stop the driving action of the shafts or rollers driven by a chain or by some other device which drives the belt-shortening shafts. When the material has dropped below a predetermined level, the level indicator device is automatically started up again and a further supply of particulate material is brought out of the flexible belt and dropped toward the bottom until it again reaches a predetermined height, at which the level indicator again stops the action. Alternatively, the function may be manually controlled.

Various other features and various other objects and operation of the device will be described in the following specification.

BRIEF DESCRIPTION OF THE DRAWINGS

FIG. 1 is a view in rear elevation of a device embodying the principles of the invention. It may be considered as a view taken along the line 1—1 in FIG. 2.

FIG. 2 is a view in vertical section taken along the line 2—2 in FIG. 1.

FIG. 3 is a view in vertical section taken along the line 3—3 in FIG. 2.

FIG. 4 is a view in vertical section taken along the line 4—4 in FIG. 2. The flexible belt is shown both in its lower or maximum-volume position, and also at its uppermost or minimum-volume position.

FIG. 5 is a view in horizontal section taken along the line 5—5 in FIG. 3, with some portions cut away.

DETAILED DESCRIPTION OF A PREFERRED EMBODIMENT

The invention may provide an external housing or main bin 10 of rigid material such as sheet metal or wood. The main bin 10 may be a simple cubic structure, or, if desired may be either wider at the top or at the bottom. In the drawings it is shown narrower at its lower end 11 than at its upper end 12. As the device is shown in FIGS. 2 and 5, it provides an inner bin which is generally similarly shaped, but this is not essential. This inner bin, when used, comprises two rigid vertical side walls 16 and 17. Between the walls 16 and 17, if used, or between the walls of the bin, is a flexible belt 20

(See FIGS. 2 to 5) which is perhaps the most important single component of the invention.

The flexible belt 20 may be of any suitable material and may be continuous and uninterrupted or may be a series of bars or other members which enable it to be flexible and to assume the various shapes shown in FIGS. 3 and 4 and in between. The main rigid bin 10 is provided with a pair of cross-shafts 21 and 22, which are provided with bolts, clamps, or other means securing ends 23 and 24 of the belt 20 to them (See FIGS. 3 and 4), so that rotating the shafts 21 and 22 results in either slackening or tightening the belt 20 and raising it from its normally slack or empty position shown at the bottom of FIG. 4 to its upper dumping position shown at the upper end of FIG. 4.

In order that the shafts 21 and 22 may be properly driven by one single motor 25, a chain 26 is provided, which is driven by the motor 25 through a driving shaft 27, having a sprocket wheel 28. The chain is connected through an idling sprocket 29, a shaft 30 and a sprocket 31 that drives a chain 32 around idling sprockets 33 and 34 to sprockets 35 and 36, respectively on the shafts 21 and 22. An idling sprocket 37 is used so that both shafts 21 and 22 act simultaneously, either to tighten or slacken the belt 20, so that the single chain 32 can drive both shafts 21 and 22. There is also a pair of idler rollers 38 and 39 which the belt 20 passes over.

Thus, by rotating the chain 32 in one direction, the belt 20 is loosened and brought down to the position shown at the lower end of FIG. 4 and also shown in FIG. 3. By rotating the chain 32 in the opposite direction, the belt 20 is gradually tightened and brought up to the top, where it is emptied of its contents.

At the upper end of the main bin 10 may be provided a cover 40 which normally closes the main bin 10. Through this cover 40, if used, extends a shaft 41 (FIGS. 3 and 4) which is preferably attached below the cover 40 to an unloading blade-like member 42, which may be shaped as shown in FIG. 5 to have a pair of parabola-shaped areas 43 and 44 (though the shape is not vital) to come against the material that is being lifted by the flexible belt 20 and acts to dump such material over the idler rollers 38 and 39 and out of the belt 20 into the main bin 10. Up above the cover is a motor 45 to drive the shaft 41. Of course, there may be a series of such motors 25 and 45, or there may be a single motor for the bin with gears and attachments. Thus, the loading and unloading of the device are simple.

As FIG. 2 shows, there may also be a pair of shafts 50 and 51, each of which may support a knife-like blade member 52 or 53 for stripping the material in the bin, for it may be wet or may otherwise be caused to adhere to the belt 20, and the blade members 52 and 53 will scrape it off. Thus, beyond the idler rollers 38 and 39 and the shafts 21 and 22 is a pair of these shafts 50 and 51, and each one of them is connected respectively to a counterweight 54 or 55 which act to hold the knife-like blade member 52 or 53 against the belt 20, so that matter can be scraped off. The material that is normally free, is pushed off by the parabola-shaped member 43 and 44 up above, whereas the material which happens to adhere to the belt 20, is scraped off by the knife-blade members 52 and 53; so that the belt 20 may be wound around the shafts 21 and 22 quite satisfactorily.

The material unloaded from the belt 20 falls down through a couple of spaces 56 and 57 between the idler members 38 and 39 and the walls of the main bin 10. In normal conditions, the material will fall down to a conveyor or an auger 60 at the bottom of the main bin 10. An auger 60 is illustrated, although, of course, some other unloading means such as a belt may be used. This auger 60 is provided with its own cylindrical or semi-cylindrical housing 61 and its motor 62, which is activated during the time when there is material to be fed through it. The auger 60 then may deliver the material to a burning chamber of a furnace 63 (FIG. 5) or to some device in which the unloaded material may be used.

To help prevent bridging over or other sources in which the material being delivered outwardly plug the device is provided with an indicating control mechanism 64 such as a level indicator, which has a swingable shaft 65 with a sensitive end portion 66 and is located in the lower portion of the main bin 20. When the material being unloaded from the belt 10 reaches a certain level, it acts through the member 66 to activate the pivoted shaft member 65 of the level indicator 64 and stops the movement of the chains 26 and 32 and therefore stops the delivery of material from the flexible belt 20. The dumped material then may be gradually dispensed, and the height at which it is stopped is that at which is very unlikely that there would be any bridging over. When it drops to a certain level, the pivoted shaft 65 falls to a level which, again, starts the motor 25 that drives the chain 26, and delivery of further material is begun.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. A device for holding and delivering a load of particulate material such as wood blocks, wood chips—dry or moist—, and briquettes, comprising:
    a main bin having an open upper end, closed side walls, and a closed bottom wall,
    a pair of drive shafts journaled across and in the side walls of said main bin,
    driving means secured to said main bin for driving said drive shafts,
    a flexible belt having one end secured to a first said drive shaft on one side of the bin and another end secured to a second said drive shaft on the opposite side of the bin,
    transmission means driven by said driving means for driving said drive shafts,
    reversing means associated with said transmission means and one of the said drive shafts for reversing the direction of rotation of one said drive shaft, so that rotation of said first and second drive shafts in one direction slackens said belt, for loading said load thereon and rotation of said first and second drive shafts in the opposite direction tighten and raise said belt and drops said load into said main bin, and
    delivery means for delivering said particulate material from said main bin.

2. The device of claim 1 having
    control means in the lower portion of said main bin below the belt, having a control lever for starting and stopping said chain, so that when the chain is started in the unloading direction and when the device is desired to be used for unloading, it raises a lower portion of said belt until the control lever of said control means is contacted by said load at a certain low point and thus stops said driving means, said driving being started again whenever the load drops a predetermined distance below said control lever.

3. The device of claim 1 having a pair of weighted knife blades supported by said outer bin near the upper end thereof, having a counterweight for each blade to hold it against the belt for scraping off material sticking to said belt as the belt is wound up.

4. The device of claim 1 wherein said main bin has a cover that can be closed horizontally over it, a shaft extending through said cover, driving means connected to said shaft for rotating it, said cover having spill-off means secured to said shaft for pushing material on said belt off from said belt into said main bin, as said belt is tightened and raised.

5. The device of claim 4 wherein said spill-off means comprises a shaped blade.

6. The device of claim 1 wherein there is a motor constituting said driving means, said chain having a series of sprockets engaging said chain.

7. The device of claim 1, including a pair of side wall members secured to said main bin on each side of the flexible belt.

8. The device of claim 1 wherein said delivery means is supported by said main bin and extending from one wall of the bin to and through an outlet opening in the opposite wall at the lower end of the bin, and driving means for driving said delivery means to move material from inside the lower portion of said main bin to a locus outside said main bin.

9. The device of claim 1 wherein said bin is open at the bottom, the opening comprising said delivery means.

10. A device for holding and delivering a load of particulate material, comprising:
   a main bin having an open upper end and side walls closed except for an outlet passing near a closed bottom wall,
   a pair of drive shafts across and journaled in the side walls of said main bin, with driving means therefrom,
   a flexible belt having one end secured to a first said drive shaft on one side of the bin and another end secured to a second said drive shaft on the opposite side of the bin,
   reversing means reversing the direction of rotation of one said drive shaft, so that rotation of said first and second drive shafts slackens said belt, for loading said load thereon and rotation of said first and second drive shafts in the opposite direction tighten and raise said belt and drops said load into said main bin,
   delivery means provided by said main bin.

11. The device of claim 10 having delivery means supported by said main bin and extending from one wall of the bin to and through said outlet opening in the opposite wall at the lower end of the bin, with driving means therefore.

12. A method for holding and delivering a load of particulate material such as wood blocks, wood chips—dry or mois—, and briquettes, into and out from a main bin having an open upper end, closed side walls, and a closed bottom wall, comprising:
   slackening a flexible belt having one end secured to a first drive shaft on one side of the bin and another end secured to a second drive shaft on the opposite side of the bin,
   putting a said load down into or on said belt,
   tightening and raising said belt and said load,
   knocking parts of the top of said load off said belt into said main bin,
   collecting the parts of said load knocked off said belt on to delivery means extending from one wall of the bin to and through an outlet in the opposite wall at the lower end of the bin, and
   carrying out each load through said outlet.

13. The method of claim 12 including stopping the tightening and raising of said belt at a height above which bridging over by said knocked-off portion of said load could take place, and
   starting the tightening and raising of said belt on a level where such bridging over does not and is unlikely to take place.

14. The method of claim 12 including scraping off loaded material as the belt is wound up by means of a pair of weighted knife blades supported by said outer bin and swung toward said belt by counterweights that hold them against the belt.

* * * * *